United States Patent
Zhang et al.

(10) Patent No.: US 11,528,776 B2
(45) Date of Patent: Dec. 13, 2022

(54) WIRELESS DEVICE POWER SAVING FOR MULTI-TRP TRANSMISSIONS

(71) Applicant: Apple Inc., Cupertino, CA (US)

(72) Inventors: Yushu Zhang, Beijing (CN); Dawei Zhang, Saratoga, CA (US); Haijing Hu, Beijing (CN); Yang Tang, Cupertino, CA (US); Wei Zeng, San Diego, CA (US); Haitong Sun, Irvine, CA (US); Hong He, Cupertino, CA (US); Yuchul Kim, Santa Clara, CA (US); Chunhai Yao, Beijing (CN); Weidong Yang, San Diego, CA (US); Chunxuan Ye, San Diego, CA (US); Jie Cui, San Jose, CA (US); Oghenekome Oteri, San Diego, CA (US); Fangli Xu, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/091,664

(22) Filed: Nov. 6, 2020

(65) Prior Publication Data
US 2021/0144808 A1    May 13, 2021

(30) Foreign Application Priority Data
Nov. 7, 2019   (CN) .......................... 201911081482.7

(51) Int. Cl.
*H04W 88/06* (2009.01)
*H04W 72/04* (2009.01)
(Continued)

(52) U.S. Cl.
CPC .......... *H04W 88/06* (2013.01); *H04B 17/318* (2015.01); *H04L 1/0026* (2013.01);
(Continued)

(58) Field of Classification Search
CPC ... H04B 17/318; H04L 1/0026; H04L 5/0023; H04W 72/046; H04W 72/0446;
(Continued)

(56) References Cited

U.S. PATENT DOCUMENTS

| 9,606,769 B2 | 3/2017 | Khan et al. |
| 9,949,184 B2 | 4/2018 | Ishii |

(Continued)

FOREIGN PATENT DOCUMENTS

WO    2019193581 A2    10/2019

OTHER PUBLICATIONS

Extended European Search Report for EP Application No. 20204827.8-1216, dated Mar. 30, 2021.

*Primary Examiner* — Harun Chowdhury
(74) *Attorney, Agent, or Firm* — Kowert, Hood, Munyon, Rankin & Goetzel, P.C.

(57) ABSTRACT

Apparatuses, systems, and methods for performing multi-TRP transmissions using techniques for reducing wireless device power consumption. A wireless device may select a downlink signal buffering method for a communication slot. The downlink signal buffering method may be selected from a single antenna panel signal buffering method or a multi-antenna panel signal buffering method. One or more beams for which to perform downlink signal buffering for the communication slot may be selected based at least in part on the downlink signal buffering method selected. Downlink signals may be received from one or more cellular base stations during the communication slot using the selected one or more beams. The downlink signals received using the selected one or more beams may be buffered by the wireless device.

20 Claims, 12 Drawing Sheets

(51) Int. Cl.
*H04B 17/318* (2015.01)
*H04L 1/00* (2006.01)
*H04W 72/12* (2009.01)
*H04W 80/02* (2009.01)

(52) U.S. Cl.
CPC ... *H04W 72/0493* (2013.01); *H04W 72/1273* (2013.01); *H04W 72/1289* (2013.01); *H04W 80/02* (2013.01)

(58) Field of Classification Search
CPC ......... H04W 72/0493; H04W 72/1273; H04W 72/1289; H04W 88/06
USPC ........................................ 370/252, 329, 330
See application file for complete search history.

(56) References Cited

U.S. PATENT DOCUMENTS

| | | |
|---|---|---|
| 10,420,029 B2 | 9/2019 | Ryu et al. |
| 2019/0223033 A1 | 7/2019 | Nam et al. |
| 2019/0335370 A1 | 10/2019 | Kumar et al. |
| 2020/0100154 A1 | 3/2020 | Cirik et al. |
| 2021/0083748 A1* | 3/2021 | Guan .................... H04L 5/0023 |
| 2021/0112561 A1* | 4/2021 | Zhou .................. H04W 72/046 |

* cited by examiner

WIRELESS DEVICE POWER SAVING FOR MULTI-TRP TRANSMISSIONS

PRIORITY DATA

This application claims benefit of priority to Chinese Application No. 201911081482.7, titled "Wireless Device Power Saving for Multi-TRP Transmissions", filed Nov. 7, 2019, which is hereby incorporated by reference in its entirety as though fully and completely set forth herein.

FIELD

The present application relates to wireless devices, and more particularly to apparatuses, systems, and methods for performing multi-TRP transmissions using techniques for reducing wireless device power consumption.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for performing multi-TRP transmissions using techniques for reducing wireless device power consumption.

According to the techniques described herein, a wireless device may be able to select a downlink signal buffering method or mode from multiple possible downlink signal buffering methods. The methods may, for example, include a single antenna panel buffering mode and a multiple antenna panel buffering mode. Depending on the buffering mode selected, the wireless device may buffer downlink signals that may include aperiodic signals intended for the wireless device (such as downlink data or aperiodic reference signals) using a single antenna panel or using multiple antenna panels. The downlink signals may be buffered according to the selected buffering mode at least until the wireless device is able to determine whether downlink control information scheduling such aperiodic signals for the wireless device is detected.

The wireless device may determine which buffering mode to use for any given communication slot (or set of communication slots) in any of a variety of possible ways. In some embodiments, the buffering mode may be selected based on one or more predefined rules, which may for example be based on any or all of signal strength, signal quality, or any of various other characteristics of potential communication channels between the wireless device and its serving cellular base station(s). In some embodiments, the buffering mode may be selected by the wireless device, and reported to the serving cellular base station(s). In some embodiments, the buffering mode may be selected by the serving cellular base station(s), and reported to the wireless device.

Utilizing such techniques for switching between multiple possible buffering modes may reduce the frequency with which a wireless device performs downlink signal buffering using multiple antenna panels, for example by potentially limiting its downlink signal buffering operations to beams with better signal strength and/or signal quality. This may in turn reduce wireless device power consumption, while limiting the impact on wireless device performance, at least according to some embodiments.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
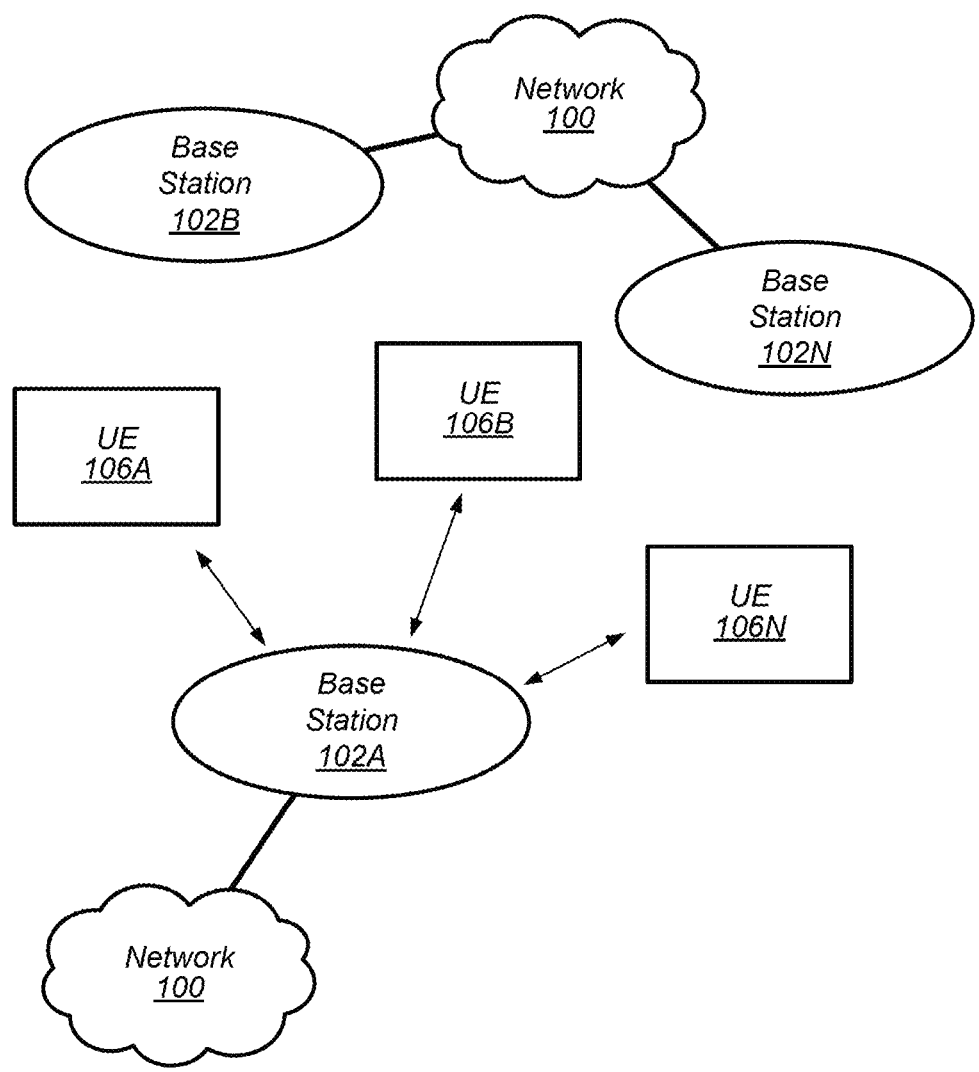
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
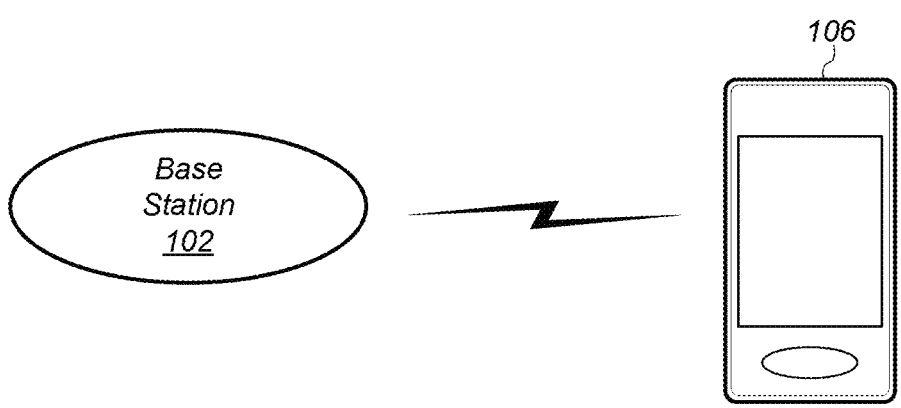
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
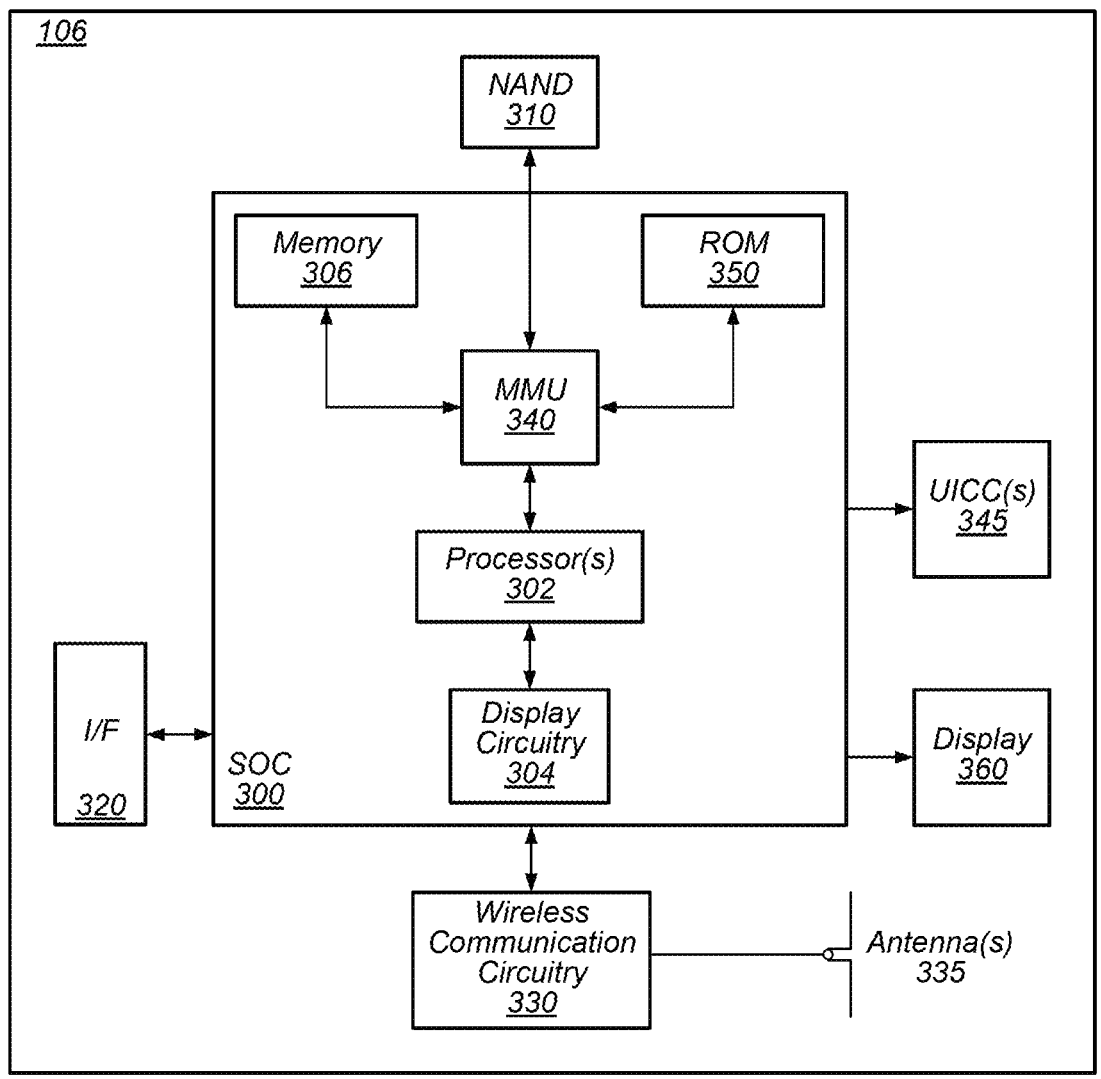
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
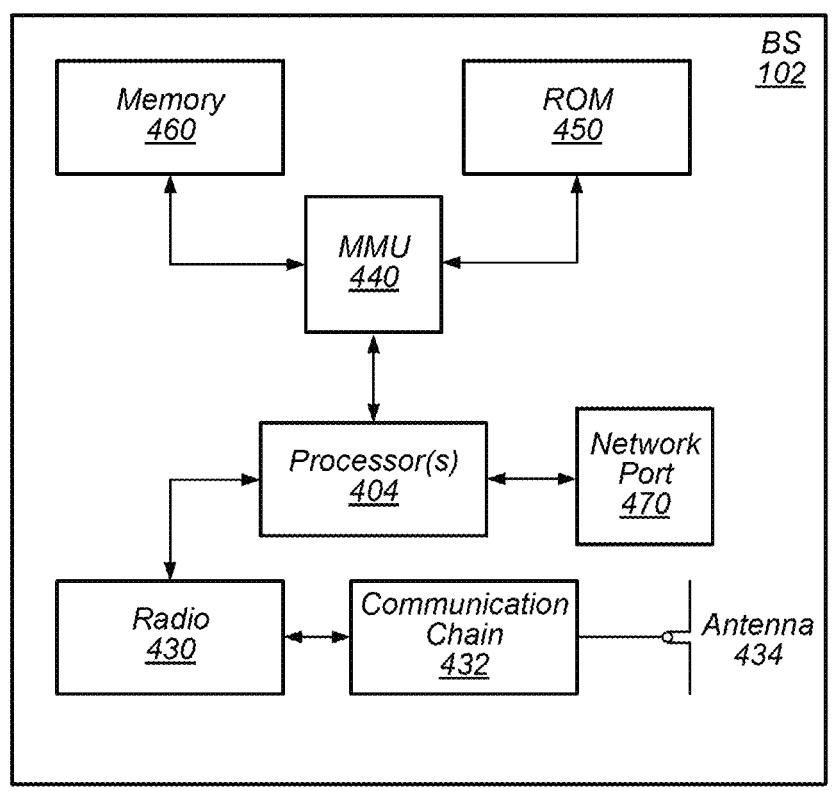
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
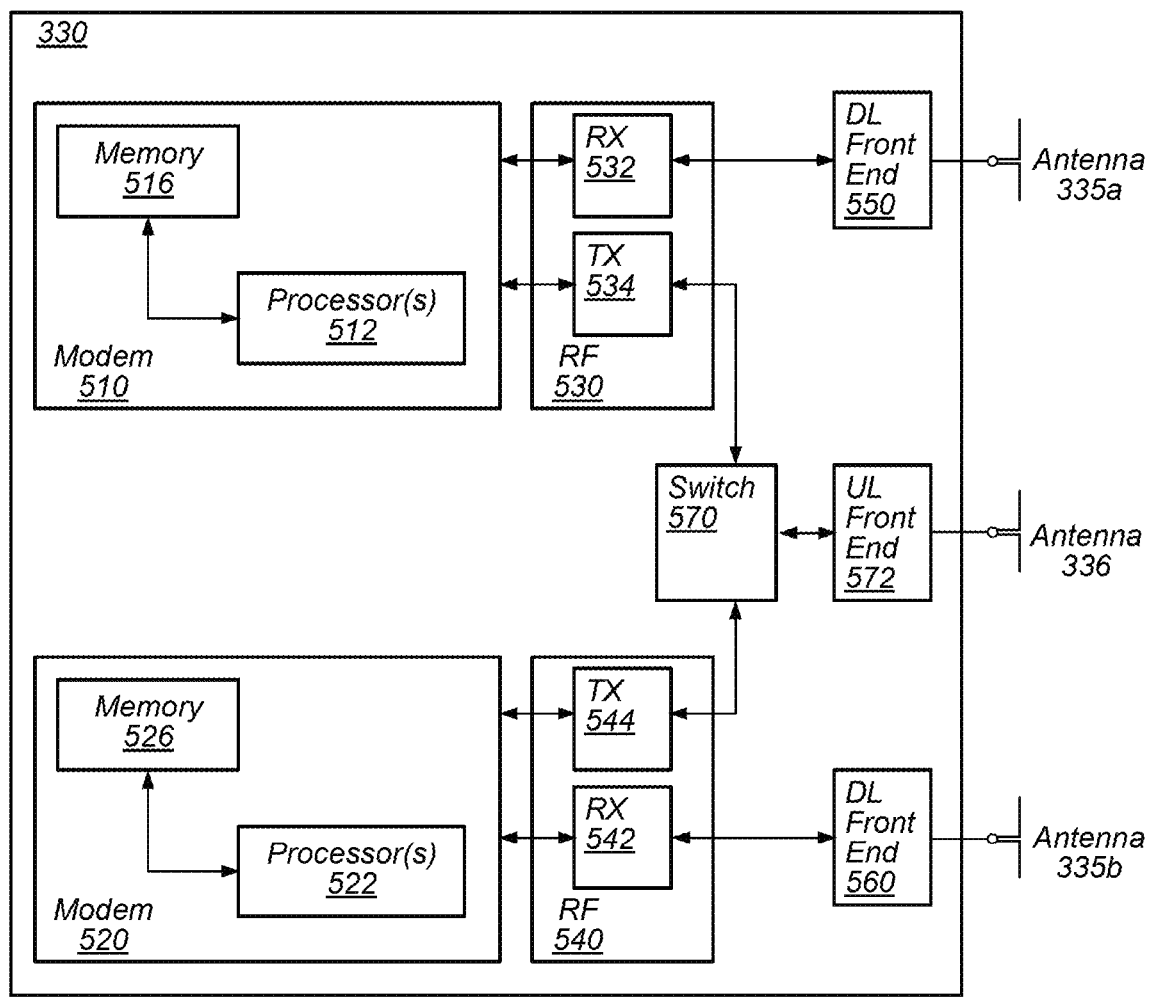
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Figure 6:
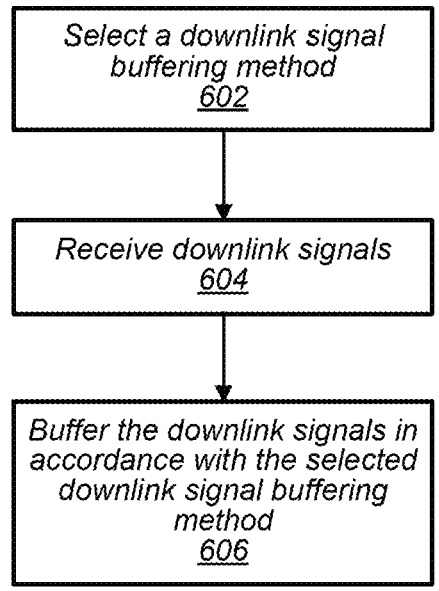
FIGS. 6-7 are flowchart diagrams illustrating aspects of an example method for performing downlink transmissions from multiple transmission reception points (TRPs) using techniques for reducing wireless device power consumption, according to some embodiments.
Figure 7:
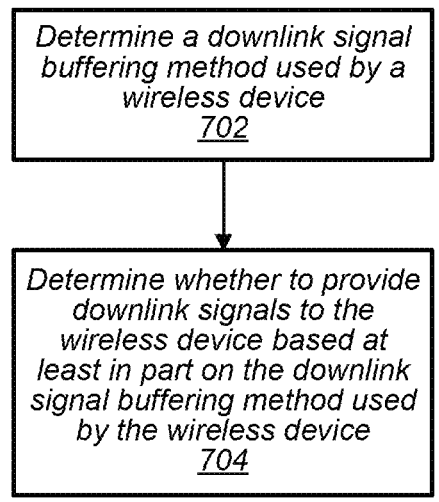

FIGS. 6-7—Wireless Device Power Savings for Multi-TRP Reception

New cellular communication techniques are continually under development, to increase coverage, to better serve the range of demands and use cases, and for a variety of other reasons. One technique that is currently under development may include scheduling transmissions in which multiple transmission reception points (TRPs) can transmit downlink data to a wireless device. As part of such development, it would be useful to provide techniques that can help reduce power consumption by wireless devices in conjunction with such multi-TRP transmissions.

For example, in some instances, it may be the case that a wireless device can be configured for single TRP operation or for multi-TRP operation in accordance with the network scheduling decisions of a cellular network with which the wireless device is in communication, potentially relatively frequently (e.g., slot by slot). To receive downlink signals from multiple TRPs, it may be the case that the wireless device needs to use multiple antenna panels. In other instances, the wireless device may only need to use a single antenna panel. However, for at least some types of signals (e.g., aperiodic signals such as PDSCH or aperiodic CSI-RS that may be triggered by PDCCH scheduling), prior to the scheduling of the signals, the wireless device may not know whether multiple TRP signaling is configured. However, to always buffer downlink signals with multiple antenna panel operation would increase the power consumption of the wireless device, as well as use more buffer space, e.g., relative to buffering downlink signals with single antenna panel operation. Thus, techniques for determining whether to use multiple antenna panel signal buffering or single antenna panel signal buffering at any particular time, that may allow the wireless device to avoid performing multiple antenna panel signal buffering in at least some scenarios while limiting any potential for performance loss, may help reduce wireless device power consumption.

Accordingly, FIGS. 6-7 are flowchart diagrams illustrating example aspects of such a method, at least according to some embodiments. Aspects of the method of FIGS. 6-7 may be implemented by a wireless device such as a UE 106 illustrated in various of the Figures herein, a base station such as a BS 102 illustrated in various of the Figures herein, and/or more generally in conjunction with any of the computer circuitry, systems, devices, elements, or components shown in the above Figures, among others, as desired. In some instances, the method of FIG. 6 may be implemented by a wireless device, and the method of FIG. 7 may be implemented by a cellular base station serving the wireless device. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the methods of FIGS. 6-7 may operate as follows.

At 602, the wireless device may select a downlink signal buffering method. The downlink signal buffering method may be selected from multiple possible signal buffering methods, such as from a single antenna panel signal buffering method (e.g., in which the wireless device only buffers signals received via a single antenna panel) or a multi-antenna panel signal buffering method (e.g., in which the wireless device buffers signals received via multiple antenna panels. The downlink signal buffering method may be selected for at least one communication slot (e.g., a specific communication slot), and possibly for a set of communication slots. In some embodiments, the downlink signal buffering method selection may be applied indefinitely (e.g., until a trigger to perform downlink signal buffering method selection again occurs).

The wireless device may additionally select one or more beams for which to perform downlink signal buffering, e.g., based at least in part on the downlink signal buffering method selected. For example, if single antenna panel signal buffering is used, but there are multiple beams configured for the wireless device, the wireless device may select which of the configured beams to receive. The wireless device may also select which antenna panel (or panels) to use. The selection of the downlink signal buffering method, the selection of which antenna panel(s) to use, and/or the selection of which beam(s) to perform downlink signal buffering for may be based on any of a variety of considerations.

As one possibility, such selection may be based at least in part on which control resource sets (CORESETs) (e.g., as identified by CORESET identifiers) are configured CORESETs for the wireless device, and/or whether a higher layer index is configured for each of the configured CORESETs for the wireless device. For example, at least according to some embodiments, if the wireless device is configured with a CORESET 0 (e.g., which may be used for fallback operation) or a CORESET configured for beam failure recovery (BFR), it may be the case that the wireless device chooses to perform single panel buffering. Similarly, if at least one CORESET is not configured with a higher layer index, it may be the case that the wireless device chooses to perform single panel buffering. For scenarios in which all configured CORESETs have higher layer indices configured and CORESET 0 and CORESET for BFR are not configured, it may be the case that the wireless device could choose to perform multiple panel buffering, but may still choose to perform single panel buffering, e.g., based on one or more other considerations.

As another (e.g., additional or alternative) possibility, selection of the downlink signal buffering method, antenna panel(s), and/or beam(s) on which to perform downlink signal buffering may be based at least in part on signal strength and/or quality of the various configured beams.

For example, in some embodiments, the selection may be based at least in part on the reference signal received power (RSRP) most recently reported (possibly within a certain specified window relative to a current communication slot, such as at least a certain number of slots k prior to the current communication slot) by the wireless device for a reference signal associated with each of one or more configured CORESETs. In such a scenario, a RSRP threshold (and possibly the value of k, if applicable) may be configured (e.g., predefined, or suggested by the wireless device as part of wireless device capability information, and/or provided by the cellular network), and the wireless device may determine to perform multiple panel buffering if the wireless device has reported RSRP above the configured RSRP threshold for reference signals (e.g., SSB/CSI-RS) associated (e.g., quasi-co-located (QCLed)) with multiple configured CORESETs. If the wireless device has reported RSRP above the configured RSRP threshold for reference signals associated with only one configured CORESET, the wireless device may determine to perform single panel buffering, and may select the antenna panel and beam associated with the configured CORESET for which RSRP is above the RSRP threshold to perform downlink signal buffering. If the wireless device has reported RSRP below the configured RSRP threshold for reference signals associated with all configured CORESETs, the wireless device may determine to perform single panel buffering, and may select the antenna panel and beam associated with a default CORESET to perform downlink signal buffering. Determination of which CORESET is considered the default CORESET may be performed in any of various ways, and may be performed according to a technique known to both the wireless device and the cellular network. For example, as one possibility, the default CORESET may be the CORESET configured in the latest communication slot with the lowest CORESET ID.

As another example, in some embodiments, the selection may be based at least in part on the channel quality indicator (CQI) most recently reported (possibly within a certain specified window relative to a current communication slot, such as at least a certain number of slots k prior to the current communication slot) by the wireless device for a reference signal associated with each of one or more configured CORESETs. In such a scenario, a CQI threshold (and possibly the value of k, if applicable) may be configured (e.g., predefined, or suggested by the wireless device as part of wireless device capability information, and/or provided by the cellular network), and the wireless device may determine to perform multiple panel buffering if the wireless device has reported CQI above the configured CQI threshold for reference signals associated with multiple configured CORESETs. If the wireless device has reported CQI above the configured CQI threshold for reference signals associated with only one configured CORESET, the wireless device may determine to perform single panel buffering, and may select the antenna panel and beam associated with the configured CORESET for which CQI is above the CQI threshold to perform downlink signal buffering. If the wireless device has reported CQI below the configured CQI threshold for reference signals associated with all configured CORESETs, the wireless device may determine to perform single panel buffering, and may select the antenna panel and beam associated with the default CORESET to perform downlink signal buffering.

As a still further example, in some embodiments, the selection may be based at least in part on whether a reference signal index (e.g., SSB resource index (SSBRI) or CSI-RS resource index (CRI)) is reported for a reference signal associated with each of one or more configured CORESETS in the most recently reported (possibly within a certain specified window relative to a current communication slot, such as at least a certain number of slots k prior to the current communication slot) beam or CSI report. In such a scenario, the wireless device may determine to perform multiple panel buffering if reference signal indices are reported for reference signals associated with multiple configured CORESETs. If the wireless device has reported a reference signal index for a reference signal associated with only one configured CORESET, the wireless device may determine to perform single panel buffering, and may select the antenna panel and beam associated with the configured CORESET for which a reference signal index was reported. If the wireless device has not reported a reference signal index for reference signals associated with any configured CORESETs, the wireless device may determine to perform single panel buffering, and may select the antenna panel and beam associated with the default CORESET to perform downlink signal buffering.

As a yet further possibility, in some embodiments, the selection may be based at least in part on whether an indication that a reference signal index associated with each of one or more one or more configured CORESETs can be received simultaneously by the wireless device is reported by the wireless device in a most recently reported (possibly within a certain specified window relative to a current communication slot, such as at least a certain number of slots k prior to the current communication slot) group based beam report. In such a scenario, the wireless device may determine to perform multiple panel buffering if the group based beam report indicates that the SSBRI and/or CRI for multiple CORESETs can be received simultaneously. If the group based beam report does not indicate that the SSBRI and/or CRI for multiple CORESETs can be received simultaneously, the wireless device may determine to perform single panel buffering, and may select the antenna panel and beam associated with the default CORESET to perform downlink signal buffering.

In 702, the cellular base station may determine the downlink signal buffering method (and potentially which beam(s) the wireless device is performing downlink signal buffering) used by the wireless device. In some embodiments, it may be the case that the wireless device determines the downlink signal buffering method, the antenna panel(s), and/or the beam(s) on which to perform downlink signal buffering in a manner that is based on information known to both the wireless device and the serving cellular base station(s) (e.g., reported RSRP, CQI, SSBRI/CRI, etc., as in the various examples previously described herein), and in a manner known to both the wireless device and the serving cellular base station (s), such that both the wireless device and the serving cellular base station(s) can autonomously determine for which beam(s) the wireless device is performing downlink signal buffering in any given communication slot in a similar manner. In such a scenario, it may be the case that there is no need to exchange signaling between the wireless device and the serving cellular base station(s) for each of these entities to determine how the wireless device will behave.

Alternatively, in some embodiments, it may be the case that one of the wireless device or a serving cellular base station of the wireless device determines which downlink signal buffering method for the wireless device to use, and provides an indication to the other party of the selected downlink signal buffering method.

For example, in some embodiments, the wireless device may receive an indication of whether to perform single antenna panel downlink signal buffering or multiple antenna panel downlink signal buffering from the cellular base station. The indication may be provided using radio resource control (RRC) signaling, a media access control (MAC) control element (CE), downlink control information (DCI), or any of a variety of other signaling mechanisms. In such a scenario, the downlink signal buffering method for received downlink signals may be selected based at least in part on the indication of whether to perform single antenna panel downlink signal buffering or multiple antenna panel downlink signal buffering that the wireless device receives from the serving cellular base station.

As another example, in some embodiments, the wireless device may select whether to perform single antenna panel downlink signal buffering or multiple antenna panel downlink signal buffering, and may provide an indication of the selected downlink signal buffering method to the cellular base station. The indication may be provided using a physical uplink control channel (PUCCH), MAC CE, or any of a variety of other signaling mechanisms.

In 704, the cellular base station may determine whether to provide downlink signals to the wireless device during a communication slot based at least in part on the downlink signal buffering method used by the wireless device. For example, if the cellular base station determines that the wireless device is not performing downlink signal buffering for any beams configured between the wireless device and the cellular base station during the communication slot, the cellular base station may determine to not provide downlink signals to the wireless device during the communication slot. If the cellular base station determines that the wireless device is performing downlink signal buffering for at least one beam configured between the wireless device and the cellular base station during the communication slot, the cellular base station may determine to provide downlink signals to the wireless device during the communication slot using a beam (or possibly multiple beams) for which the wireless device is performing downlink signal buffering.

In 604, the wireless device may receive downlink signals from one or more serving cellular base stations during a communication slot. The downlink signals may be received from multiple TRPs, according to some embodiments. Alternatively, in some instances, the downlink signals may be received from only one TRP. The downlink signals may be received using one or more beams configured for the wireless device and selected by the wireless device for reception during the communication slot.

Thus, at least according to some embodiments, the cellular base station(s) may provide the downlink signals to the wireless device during the communication slot using a beam that is among the one or more beams for which the wireless device is performing downlink signal buffering for the communication slot, e.g., based at least in part on having determined the one or more beams for which the wireless device is performing downlink signal buffering for the communication slot.

In 606, the wireless device may buffer the downlink signals in accordance with the selected downlink signal buffering method. This may include buffering downlink signals received using a single antenna panel of the wireless device if a single antenna panel signal buffering method is selected. If a multiple antenna panel signal buffering method is selected, this may include buffering downlink signals received using multiple antenna panels of the wireless device. The downlink signals received and buffered may include downlink data channel(s) (e.g., PDSCH), aperiodic reference signals (e.g., aperiodic CSI-RS) that may be triggered by PDCCH indication provided in a CORESET. The wireless device may buffer the signals until the wireless device completes PDCCH detection to determine whether the downlink signals received include data for the wireless device. Once PDCCH detection is complete, if no PDCCH is detected for a given CORESET, the wireless device may no longer need to buffer the downlink signals associated with the CORESET, and so may cease buffering the downlink signals for the communication slot (or set of communication slots). If a PDCCH scheduling a downlink transmission to the wireless device is detected for a given CORESET, the wireless device may decode (e.g., at least a portion of) the buffered downlink signals in accordance with the PDCCH scheduling.

Thus, the methods of FIGS. 6-7 may be used by multiple TRPs and a wireless device to perform single-TRP and multi-TRP downlink communications to the wireless device with reduced power consumption by the wireless device, at least according to some embodiments.

FIGS. 8-15 and Additional Information

FIGS. 8-15 illustrate further aspects that might be used in conjunction with the method of FIG. 6 if desired. It should be noted, however, that the exemplary details illustrated in and described with respect to FIGS. 8-15 are not intended to be limiting to the disclosure as a whole: numerous variations and alternatives to the details provided herein below are possible and should be considered within the scope of the disclosure.

Figure 8:
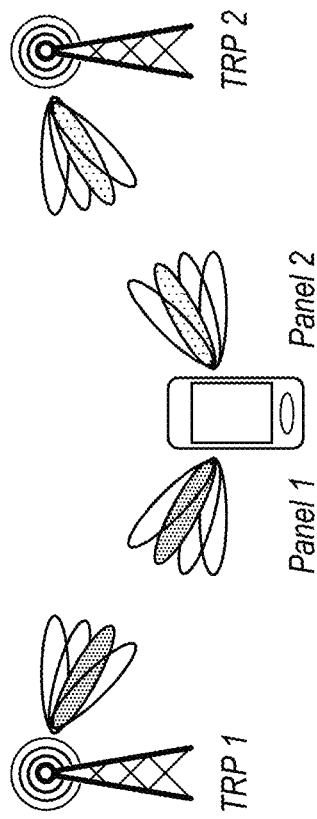
FIG. 8 illustrates aspects of an exemplary possible multi-TRP downlink transmission scenario, according to some embodiments.

In 3GPP Release 16, it may be the case that downlink multi-TRP operation is specified. According to such operation, a UE may receive downlink signals from multiple TRPs, where such downlink signals may include PDCCH, PDSCH, and CSI-RS, among other possible signals. To receive multiple signals from multiple TRPs simultaneously, the UE may need to use multiple antenna panels, for example for 3GPP frequency range 2 (FR2), at least according to some embodiments. FIG. 8 illustrates aspects of an exemplary such scenario in which a UE receives signals from multiple TRPs using multiple antenna panels simultaneously. It may be the case that the downlink signals from multiple TRPs may be scheduled by a single DCI or multiple DCIs.

Figure 9:
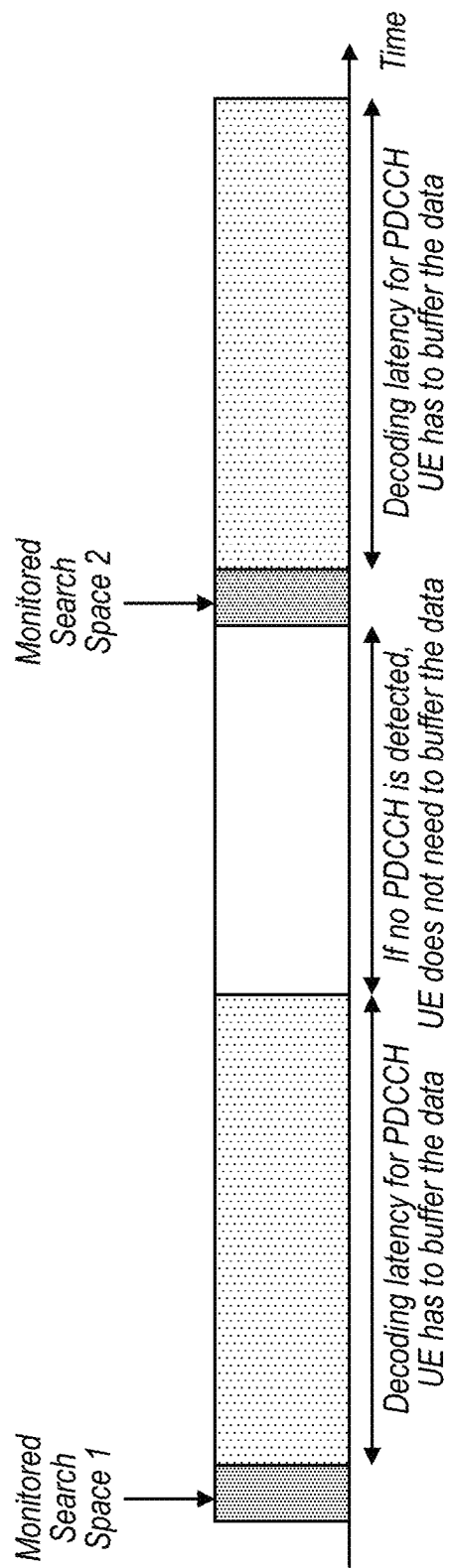
FIG. 9 illustrates aspects of exemplary possible wireless device downlink operation, according to some embodiments.

Whether a gNB serving a UE schedules downlink signals to the UE based on single TRP operation or multi-TRP operation could be up to the gNB's scheduling decision, which could potentially be changed relatively frequently, such as on a slot-by-slot basis. For aperiodic signals (e.g., PDSCH, aperiodic CSI-RS) that is triggered by PDCCH, before the scheduling PDCCH is received, it may be the case that the UE has no information whether such aperiodic signals are triggered. Accordingly, the UE may have to buffer the corresponding signal before the PDCCH scheduling that signal is detected. FIG. 9 is a timeline illustrating aspects of such possible downlink signal buffering operation, according to some embodiments.

To always perform such downlink signal buffering with multi-panel operation may result in an increase to UE power consumption and require a larger buffer size for such signal buffering. Accordingly, it may be beneficial to define how a UE is expected to perform downlink signal buffering for aperiodic signals when multi-TRP operation is possible in a way that provides at least some power saving opportunities relative to always performing downlink signal buffering with multi-panel operation when multi-TRP operation is possible.

As one aspect of defining UE behavior for downlink signal buffering for aperiodic signals when multi-TRP operation can be used, it may be possible to specify multiple possible downlink signal buffering methods. For example, as one possibility, a single panel buffering mode may be specified, in which a UE buffers the data based on a CORESET's beam, where the CORESET for which data is buffered may be selected as the CORESET in the latest slot with the lowest CORESET ID from the configured CORESETs, or in any of various other ways. As another possibility, a multi-panel buffering mode may be specified, in which a UE buffers the data based on the CORESETs' beam, where the CORESETs for which data is buffered may be selected as the CORESETs in the latest slot with the lowest CORESET ID from the configured CORESETs that are configured with the same higher layer index, for each of the multiple antenna panels.

Figure 10:
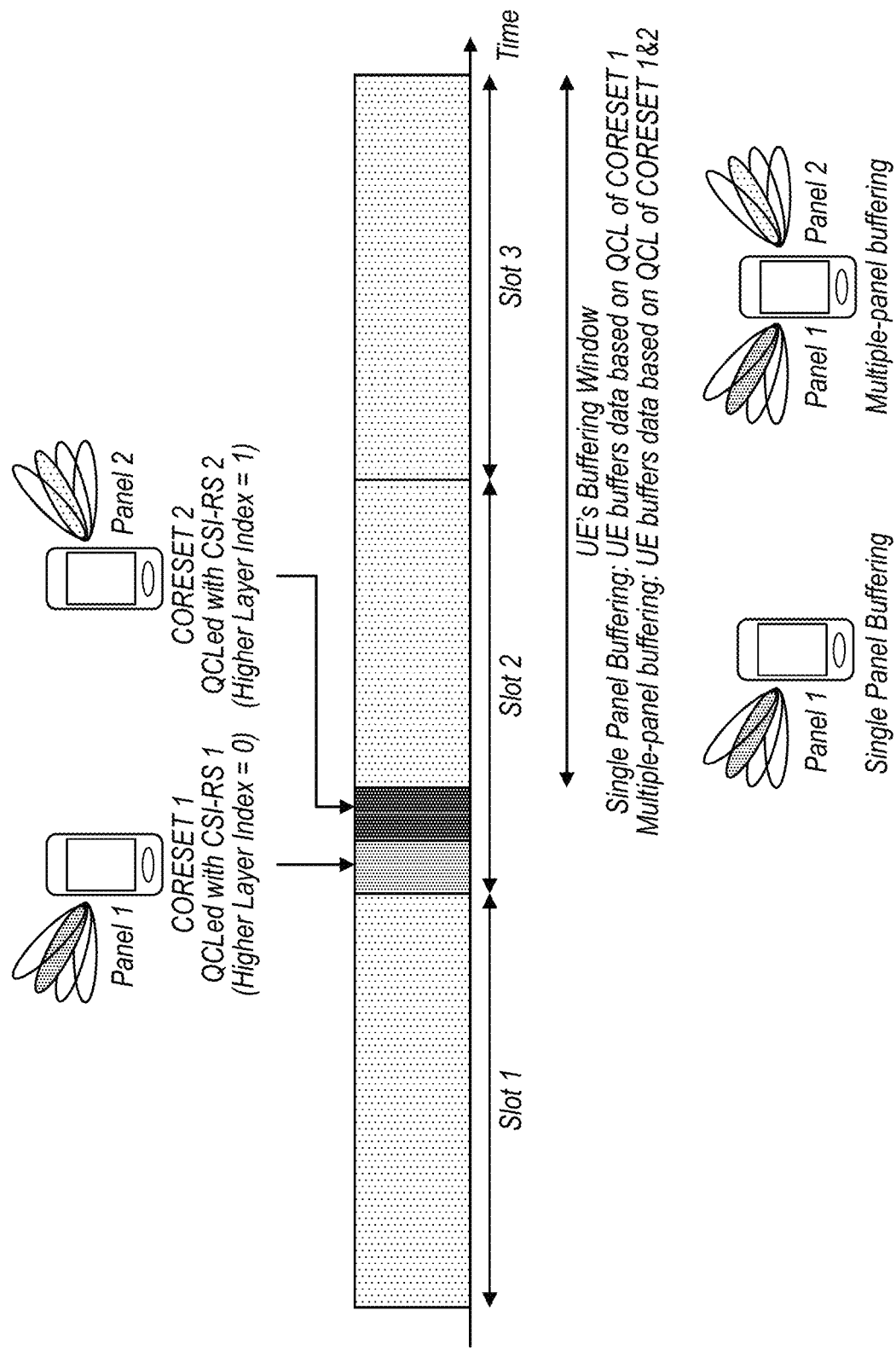
FIGS. 10-15 illustrates aspects of wireless device signal buffering operation in various exemplary possible scenarios, according to some embodiments.

FIG. 10 illustrates aspects of such possible multiple downlink signal buffering methods, according to some embodiments. As shown, in the illustrated scenario, a UE may be configured with CORESET 1, which may be QCLed with CSI-RS 1, and be configured with higher layer index=0. The UE may also be configured with CORESET 2 which may be QCLed with CSI-RS 2, and be configured with higher layer index=1. Under such circumstances, if the UE is utilizing single panel buffering, the UE may buffer data based on the downlink beam that is QCL with CORESET 1 during a buffering window for the illustrated set of communication slots, and may not buffer data based on the downlink beam that is QCL with CORESET 2. If the UE is utilizing multiple panel buffering, the UE may buffer data based on both the downlink beam that is QCL with CORESET 1 and the downlink beam that is QCL with CORESET 2 during the buffering window.

There may be numerous possible options for a UE to determine whether to activate multiple antenna panels or a single antenna panel to buffer aperiodic signals. As one possibility, a predefined rule may be used, e.g., such that both the UE and the network may be able to determine which antenna panel(s) the UE will use to buffer aperiodic signals in any given communication slot. The predefined rule may be based on any of various possible considerations.

Figure 11:
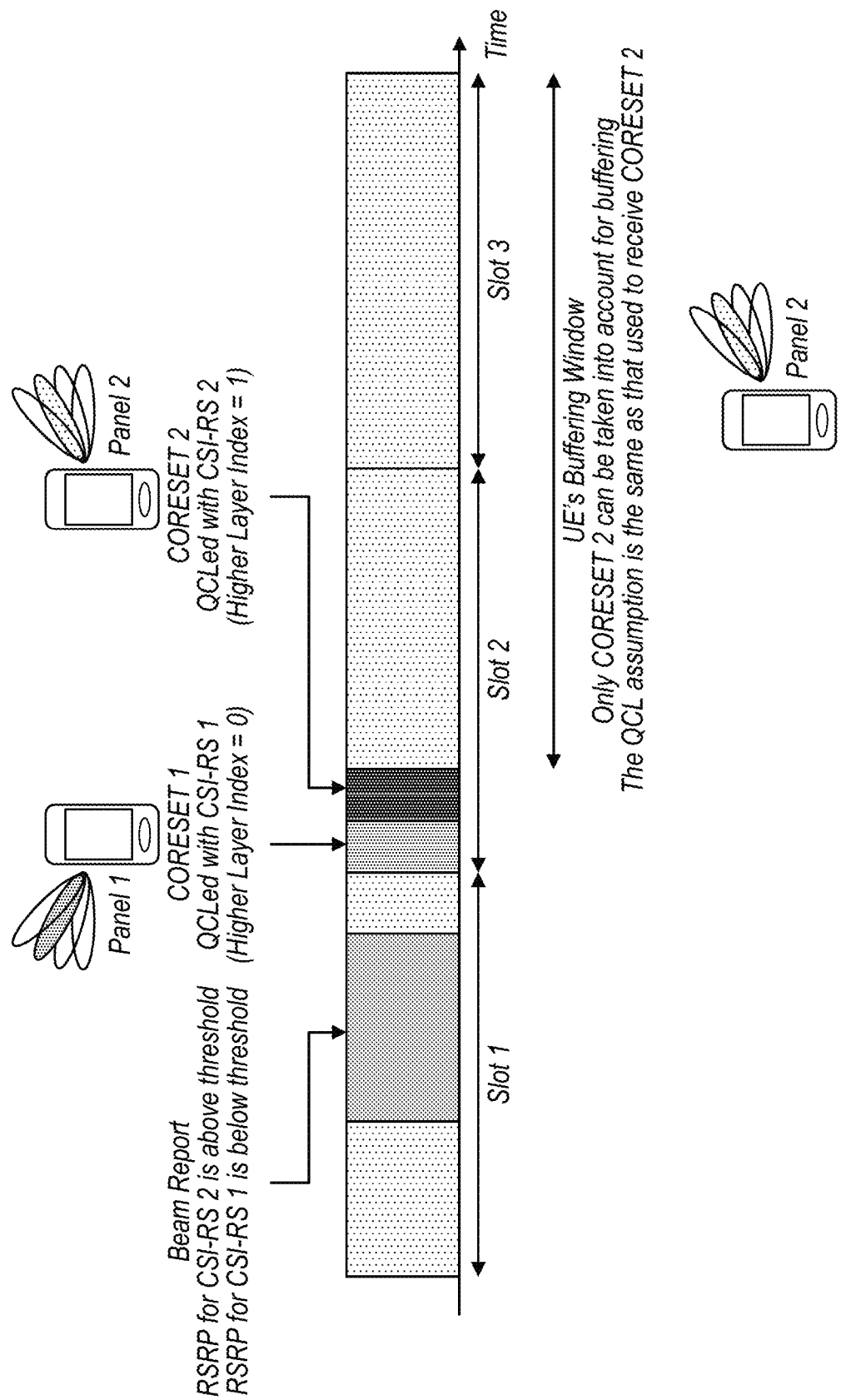

As one such possibility, the single panel or multi-panel buffering mode could be determined by the reported RSRP for the SSB/CSI-RS that is QCLed with the corresponding CORESET. For example, it may be the case that if the most recent reported RSRP before slot n-k is lower than a RSRP threshold, the CORESET is not selected by the UE for possible PDSCH/CSI-RS buffering in slot n. The RSRP threshold and value of k could be predefined, based on UE capability information, configured by higher layer signaling, or determined in any of various other ways. FIG. 11 illustrates aspects of an exemplary possible scenario in which such an approach is used to determine the buffering mode used by a UE. In the illustrated scenario, a UE may be configured with CORESET 1, which may be QCLed with CSI-RS 1, and be configured with higher layer index=0. The UE may also be configured with CORESET 2 which may be QCLed with CSI-RS 2, and be configured with higher layer index=1. The RSRP in the applicable beam report for CSI-RS 2 may be above the configured RSRP threshold, while the RSRP for CSI-RS 1 may be below the configured RSRP threshold. In this scenario, the UE may apply the single panel buffering mode and buffer data based on the downlink beam that is QCL with CORESET 2 during the buffering window.

Figure 12:
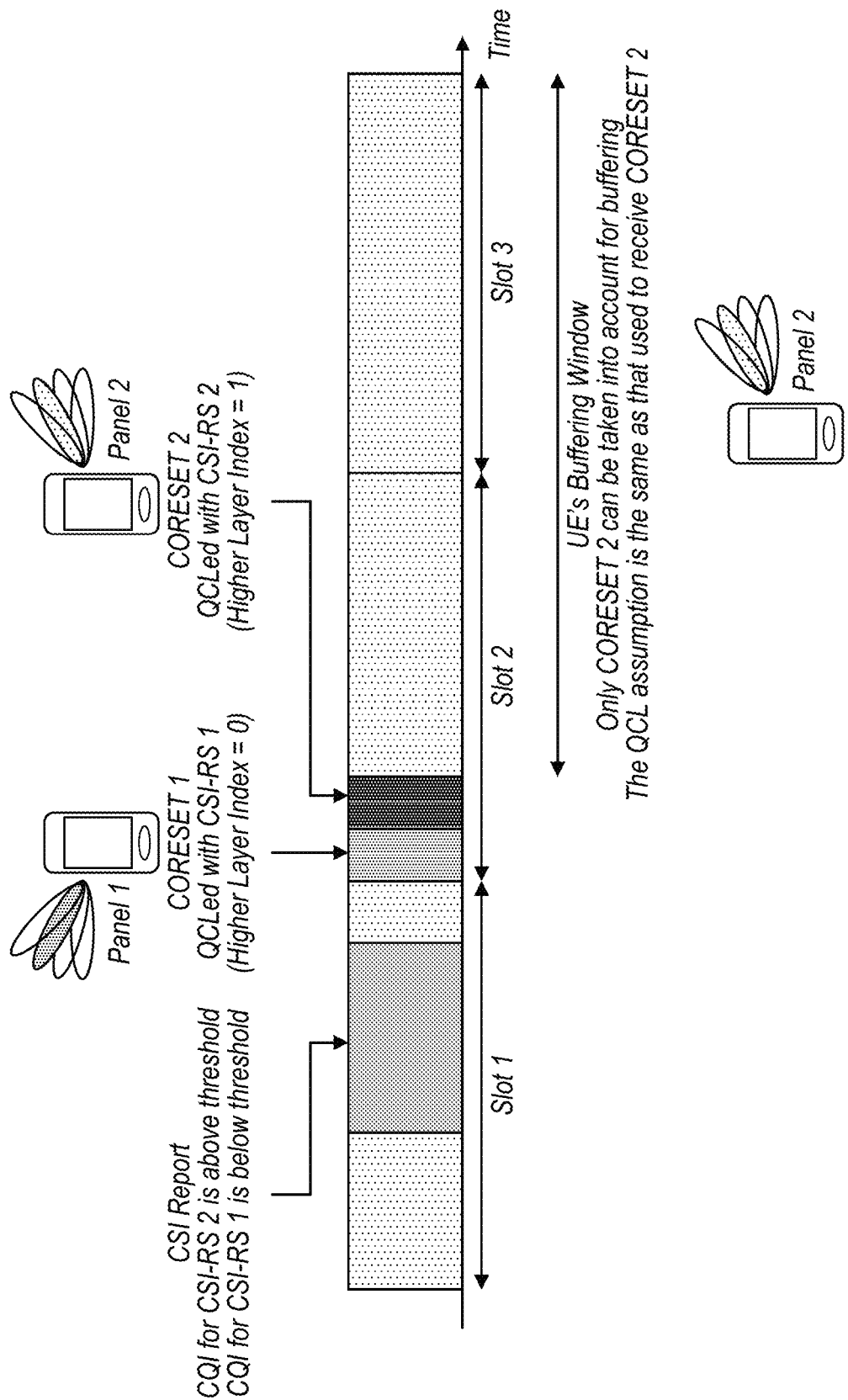

As another such possibility, the single panel or multi-panel buffering mode could be determined by the reported CQI for the CSI-RS that is QCLed with the corresponding CORESET. For example, it may be the case that if the most recent reported CQI before slot n-k is lower than a CQI threshold, the CORESET is not selected by the UE for possible PDSCH/CSI-RS buffering in slot n. The CQI threshold and value of k could be predefined, based on UE capability information, configured by higher layer signaling, or determined in any of various other ways. FIG. 12 illustrates aspects of an exemplary possible scenario in which such an approach is used to determine the buffering mode used by a UE. In the illustrated scenario, a UE may be configured with CORESET 1, which may be QCLed with CSI-RS 1, and be configured with higher layer index=0. The UE may also be configured with CORESET 2 which may be QCLed with CSI-RS 2, and be configured with higher layer index=1. The CQI in the applicable beam report for CSI-RS 2 may be above the configured CQI threshold, while the CQI for CSI-RS 1 may be below the configured CQI threshold. In this scenario, the UE may apply the single panel buffering mode and buffer data based on the downlink beam that is QCL with CORESET 2 during the buffering window.

Figure 13:
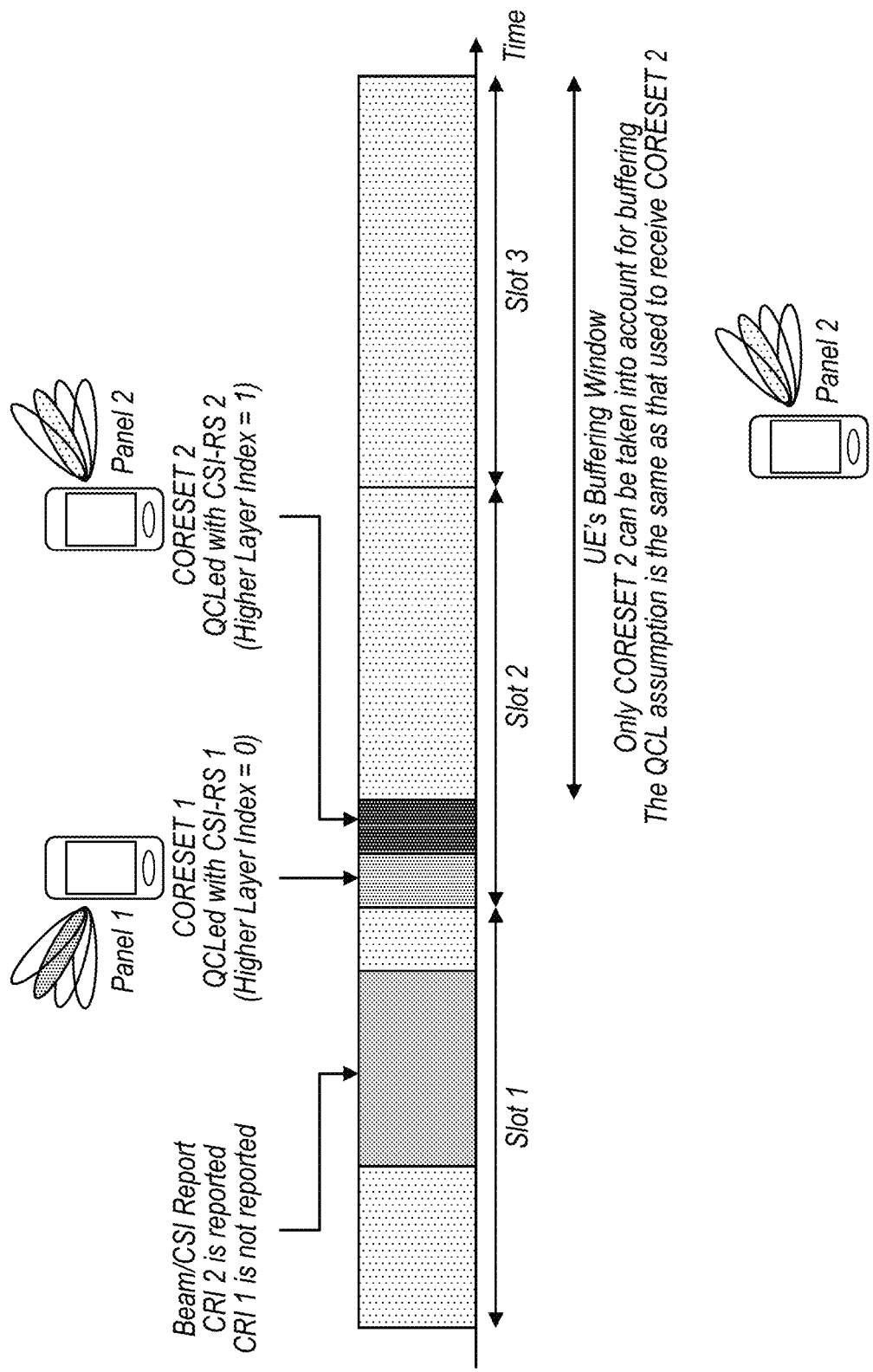

As a further such possibility, the single panel or multi-panel buffering mode for slot n could be determined by the reported SSBRI or CRI in the most recent beam/CSI report before slot n-k. For example, if the SSBRI/CRI that is QCLed with the corresponding CORESET has not been reported, it may be the case that the CORESET is not taken into account as a candidate for buffering. The value of k could be predefined, based on UE capability information, configured by higher layer signaling, or determined in any of various other ways. FIG. 13 illustrates aspects of an exemplary possible scenario in which such an approach is used to determine the buffering mode used by a UE. In the illustrated scenario, a UE may be configured with CORESET 1, which may be QCLed with CSI-RS 1, and be configured with higher layer index=0. The UE may also be configured with CORESET 2 which may be QCLed with CSI-RS 2, and be configured with higher layer index=1. The CRI 2 in the applicable beam/CSI report may be reported—while the CRI 1 may not be reported. In this scenario, the UE may apply the single panel buffering mode and buffer data based on the downlink beam that is QCL with CORESET 2 during the buffering window.

Figure 14:
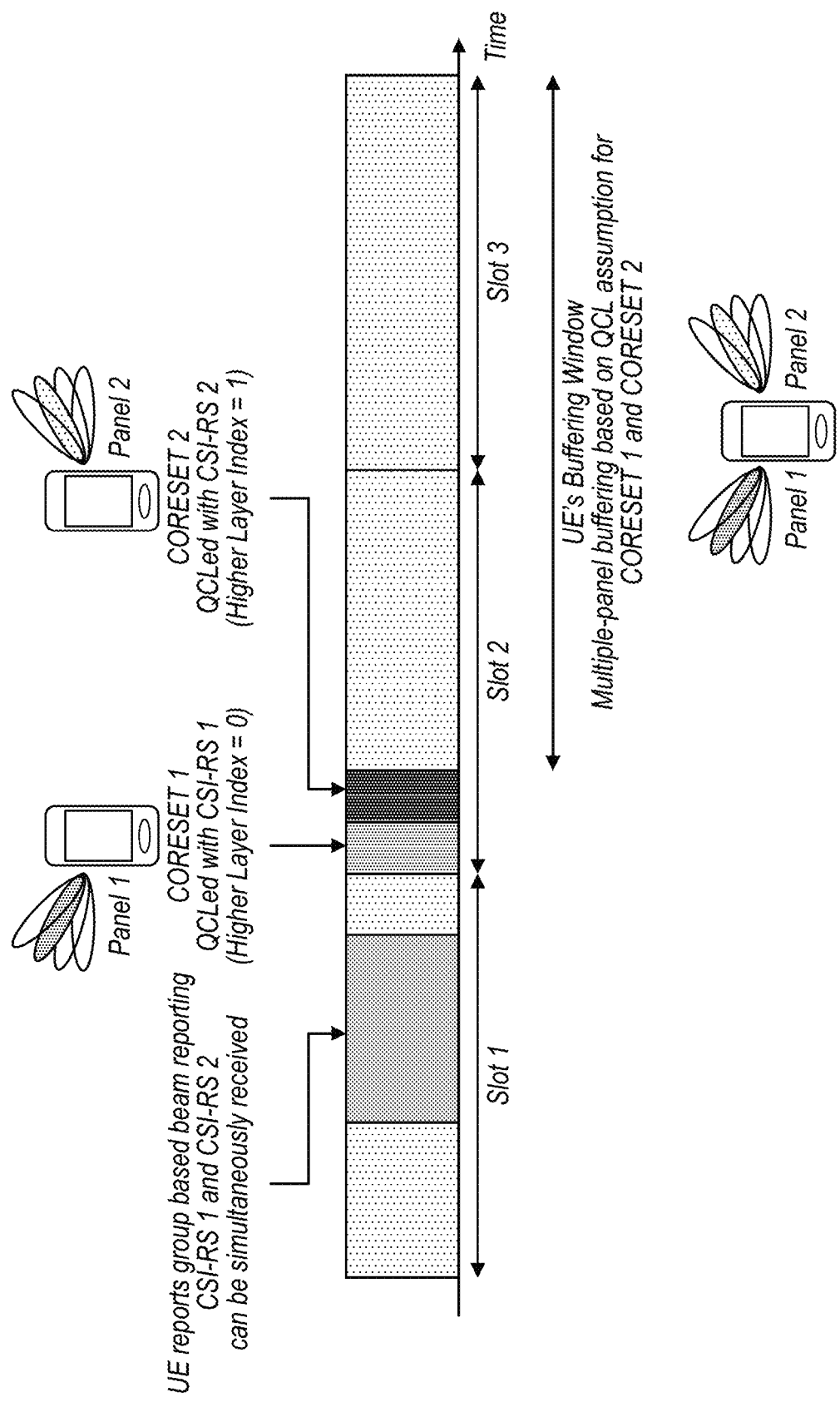

As a still further such possibility, the single panel or multi-panel buffering mode for slot n could be determined based on whether the UE reported that the SSBRI or CRI from multiple CORESETs can be received simultaneously in the most recent group based beam report before slot n-k. For example, if the SSBRI/CRI for multiple CORESETs can be simultaneously received, it may be the case that multi-panel buffering is selected, and that otherwise single panel buffering is selected. The value of k could be predefined, based on UE capability information, configured by higher layer signaling, or determined in any of various other ways. FIG. 14 illustrates aspects of an exemplary possible scenario in which such an approach is used to determine the buffering mode used by a UE. In the illustrated scenario, a UE may be configured with CORESET 1, which may be QCLed with CSI-RS 1, and be configured with higher layer index=0. The UE may also be configured with CORESET 2 which may be QCLed with CSI-RS 2, and be configured with higher layer index=1. The UE may report in the applicable group based beam report that CSI-RS 1 and CSI-RS 2 can be simultaneously received. In this scenario, the UE may apply the multi-panel buffering mode and buffer data based on the downlink beam that is QCL with CORESET 1 as well as on the downlink beam that is QCL with CORESET 2 during the buffering window.

In some instances, the single panel or multi-panel buffering mode for slot n could be determined based on the candidate CORESETs that would be used for multi-panel buffering. For example, if one of the CORESETs that could be used for multi-panel buffering is CORESET #0 or a CORESET configured for beam failure recovery (BFR), it may be the case that single panel buffering is used. It may be the case that the beam for CORESET #0 and CORESET for BFR can be based on the most recent RACH procedure, so the gNB may not have any information whether they can be simultaneously received by the wireless device with other CORESETs or not. Additionally or alternatively, if one of the CORESETs is not configured with a higher layer index, it may be the case that single panel buffering is used. For other scenarios (e.g., in which all CORESETs are configured with higher layer indices and CORESET #0 and CORESET for BFR are excluded), it may be the case that multi-panel buffering could be selected (e.g., possibly further contingent on one or more other conditions being met).

Figure 15:
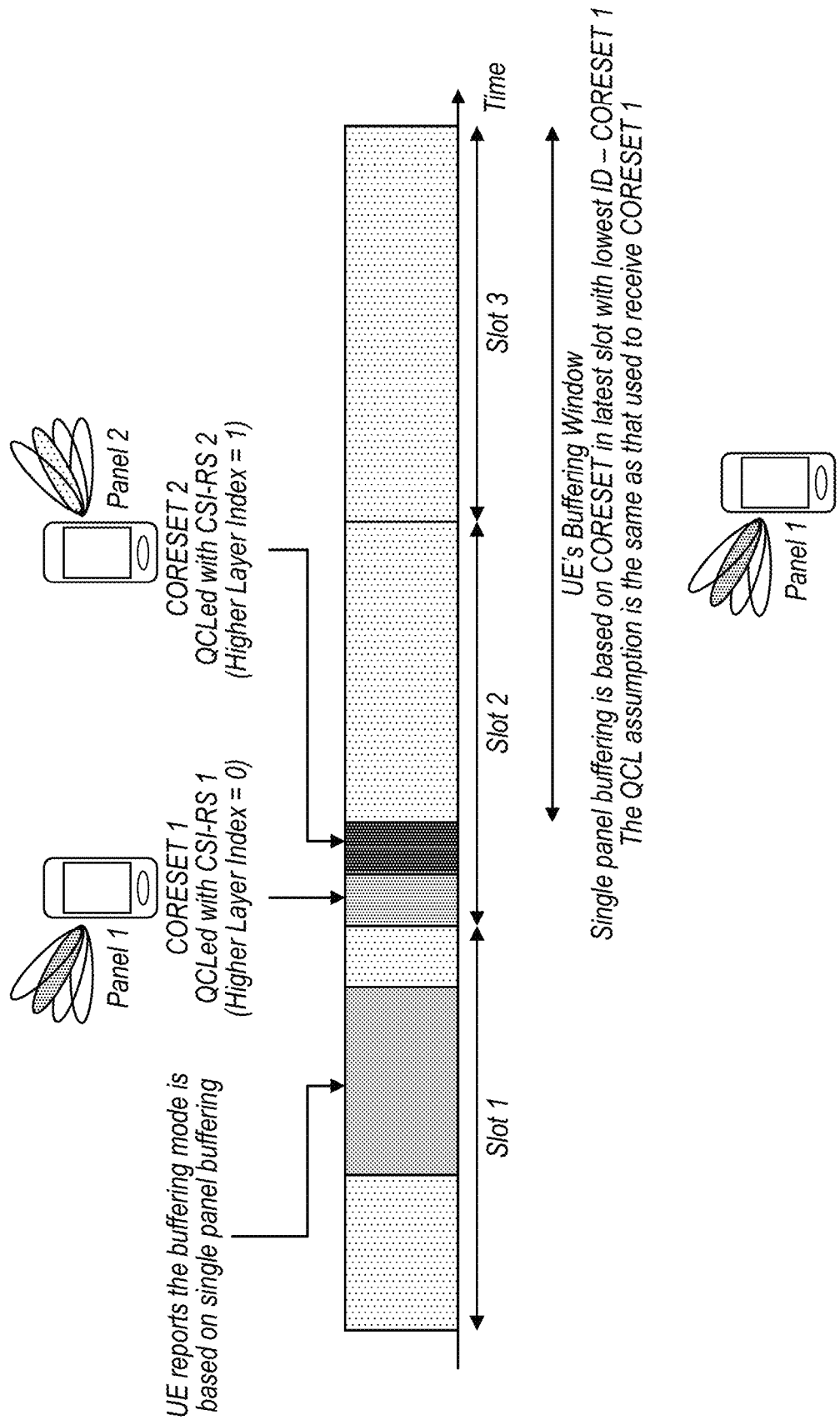

As a further possibility, instead of using a predetermined rule that the UE and the network can each autonomously determine, it may be possible for one or the other of the UE or the network to determine whether the UE should use single panel buffering or multi-panel buffering and indicate the selection to the other. For example, the switching between single panel buffering and multi-panel buffering could be based on a UE report. The report could be carried by a MAC CE or PUCCH, e.g., such that the UE can report its buffering mode per serving cell or per serving cell group. In such a scenario, it may be the case that if the MAC CE or PUCCH indicating the buffering mode selected by the UE is reported in slot n, the UE would apply this buffering mode in slot n+k, where the value of k could be predefined, based on UE capability information, configured by higher layer signaling, or determined in any of various other ways. A prohibit timer could also be configured by the network, e.g., using higher layer signaling, to prevent the UE from switching buffering modes excessively frequently, if desired. For example, if such a prohibit timer is configured and running, the UE may refrain from reporting its buffering mode (and/or any such indications from the UE may be ignored by the network). When the prohibit timer expires, the UE may again be permitted to report its buffering mode. The UE could also report whether it supports single panel buffering or multi-panel buffering using a UE capability indication. FIG. 15 illustrates aspects of an exemplary possible scenario in which such an approach is used to determine the buffering mode used by a UE. In the illustrated scenario, a UE may be configured with CORESET 1, which may be QCLed with CSI-RS 1, and be configured with higher layer index=0. The UE may also be configured with CORESET 2 which may be QCLed with CSI-RS 2, and be configured with higher layer index=1. The UE may report that the UE is using the single panel buffering mode. In this scenario, the UE may apply the single panel buffering mode and buffer data based on the downlink beam that is QCL with CORESET 1 (e.g., since it is the CORESET in the latest slot with the lowest ID) during the buffering window.

As another possibility, the switching between single panel buffering and multi-panel buffering could be configured by the network, e.g., using RRC signaling, MAC CE signaling, DCI signaling, or in any of various other possible ways.

As a still futher possibility, the switching between single panel buffering and multi-panel buffering could be determined by the multi-TRP mode configuration. For example, if the gNB configures the UE to operate based on multi-DCI mode, the UE may be configured to use the multi-panel buffering mode. Otherwise (e.g., if multi-DCI mode is not configured), the UE may be configured to use the single panel buffering mode.

It should be noted that the same or different options for selecting a buffering mode may be applied for different types of aperiodic signals (e.g., for PDSCH signals and for aperiodic CSI-RS signals). Still further, it should be noted that multiple options or aspects of multiple possible approaches may be used in combination and/or at different times for selecting a buffering mode for a UE, at least according to some embodiments.

In the following further exemplary embodiments are provided.

One set of embodiments may include a wireless device, comprising: at least two antenna panels; at least one radio coupled to the at least one antenna; and a processor coupled to the at least one radio; wherein the wireless device is configured to: select a downlink signal buffering method for received downlink signals, wherein the downlink signal buffering method is selected from at least a single antenna panel signal buffering method or a multi-antenna panel signal buffering method; receive downlink signals from one or more cellular base stations; and buffer the downlink signals in accordance with the selected downlink signal buffering method.

According to some embodiments, the wireless device is further configured to: select one or more beams for which to perform downlink signal buffering based at least in part on the downlink signal buffering method selected.

According to some embodiments, the downlink signal buffering method is selected based at least in part on one or more of: a control resource set (CORESET) identifier associated with each of one or more configured CORESETs; or whether a higher layer index is configured for each of the one or more configured CORESETs.

According to some embodiments, the downlink signal buffering method is selected based at least in part on reference signal received power (RSRP) reported by the wireless device for a reference signal associated with each of one or more configured control resource sets (CORESETs).

According to some embodiments, the downlink signal buffering method is selected based at least in part on channel quality indicator (CQI) reported by the wireless device for a reference signal associated with each of one or more configured control resource sets (CORESETs).

According to some embodiments, the downlink signal buffering method is selected based at least in part on whether a reference signal index is reported for a reference signal associated with each of one or more configured control resource sets (CORESETs).

According to some embodiments, the downlink signal buffering method is selected based at least in part on whether a group based beam reporting indication provided by the wireless device within a specified period of time indicates that a reference signal index associated with each of one or more one or more configured control resource sets (CORESETs) can be received simultaneously by the wireless device.

According to some embodiments, the wireless device is further configured to: provide an indication of the selected downlink signal buffering method for received downlink signals to a serving cellular base station of the wireless device.

According to some embodiments, the wireless device is further configured to: receive an indication of whether to perform single antenna panel downlink signal buffering or multiple antenna panel downlink signal buffering from a serving cellular base station of the wireless device; wherein the downlink signal buffering method for received downlink signals is selected based at least in part on the indication of whether to perform single antenna panel downlink signal buffering or multiple antenna panel downlink signal buffering.

Another set of embodiments may include an apparatus, comprising: a processor configured to cause a wireless device to: select a downlink signal buffering method for a communication slot, wherein the downlink signal buffering method is selected from at least a single antenna panel signal buffering method or a multi-antenna panel signal buffering method; select one or more beams for which to perform downlink signal buffering for the communication slot based at least in part on the downlink signal buffering method selected; receive downlink signals from one or more cellular base stations during the communication slot using the selected one or more beams; and buffer the downlink signals received using the selected one or more beams.

According to some embodiments, the processor is further configured to cause the wireless device to select the one or more beams for which to perform downlink signal buffering for the communication slot based at least in part on one or more of: a control resource set (CORESET) identifier associated with each of one or more possible beams; or whether a higher layer index is configured for a CORESET associated with each of the one or more possible beams.

According to some embodiments, the processor is further configured to cause the wireless device to select the one or more beams for which to perform downlink signal buffering for the communication slot based at least in part on one or more of: reference signal received power (RSRP) reported by the wireless device for a reference signal associated with each of one or more possible beams within a specified period of time; channel quality indicator (CQI) reported by the wireless device for a reference signal associated with each of one or more possible beams within a specified period of time; whether the wireless device reported a reference signal index for a reference signal associated with each of one or more possible beams within a specified period of time; or whether the wireless device provided a group based beam reporting indication within a specified period of time that indicates that one or more possible beams can be received simultaneously by the wireless device.

According to some embodiments, the processor is further configured to cause the wireless device to: determine whether a prohibit timer for downlink signal buffering method reporting is configured and running; and provide an indication of the selected downlink signal buffering method to a serving cellular base station of the wireless device if no prohibit timer for downlink signal buffering method reporting is running.

According to some embodiments, the processor is further configured to cause the wireless device to: receive an indication of whether to perform single antenna panel downlink signal buffering or multiple antenna panel downlink signal buffering from a serving cellular base station of the wireless device; wherein the downlink signal buffering method is selected based at least in part on the indication of whether to perform single antenna panel downlink signal buffering or multiple antenna panel downlink signal buffering.

Yet another set of embodiments may include a cellular base station, comprising: at least one antenna; at least one radio coupled to the at least one antenna; and a processor coupled to the at least one radio; wherein the cellular base station is configured to: determine whether a wireless device is performing single antenna panel downlink signal buffering or multiple antenna panel downlink signal buffering for a communication slot; determine one or more beams for which the wireless device is performing downlink signal buffering for the communication slot based at least in part on whether the wireless device is performing single antenna panel downlink signal buffering or multiple antenna panel downlink signal buffering for the communication slot; and determine whether to provide downlink signals to the wireless device during the communication slot based at least in part on the one or more beams for which the wireless device is performing downlink signal buffering for the communication slot.

According to some embodiments, when the cellular base station determines to provide downlink signals to the wireless device during the communication slot, the cellular base station is further configured to: provide downlink signals to the wireless device during the communication slot using a beam that is among the one or more beams for which the wireless device is performing downlink signal buffering for the communication slot based at least in part on having determined the one or more beams for which the wireless device is performing downlink signal buffering for the communication slot.

According to some embodiments, the one or more beams for which the wireless device is performing downlink signal buffering for the communication slot are determined based at least in part on one or more of: a control resource set (CORESET) identifier associated with each of one or more possible beams; or whether a higher layer index is configured for a CORESET associated with each of the one or more possible beams.

According to some embodiments, the one or more beams for which the wireless device is performing downlink signal buffering for the communication slot are determined based at least in part on one or more of: reference signal received power (RSRP) reported by the wireless device for a reference signal associated with each of one or more possible beams within a specified period of time; channel quality indicator (CQI) reported by the wireless device for a reference signal associated with each of one or more possible beams within a specified period of time; whether the wireless device reported a reference signal index for a reference signal associated with each of one or more possible beams within a specified period of time; or whether a group based beam reporting indication received from the wireless device within a specified period of time indicates that one or more possible beams can be received simultaneously by the wireless device.

According to some embodiments, the cellular base station is further configured to: configure a prohibit timer for downlink signal buffering method reporting for the wireless device; receive an indication from the wireless device of whether the wireless device is performing single antenna panel downlink signal buffering or multiple antenna panel downlink signal buffering for the communication slot while the prohibit timer for downlink signal buffering method reporting is not running, wherein whether the wireless device is performing single antenna panel downlink signal buffering or multiple antenna panel downlink signal buffering for the communication slot is determined based at least in part on the indication from the wireless device of whether the wireless device is performing single antenna panel downlink signal buffering or multiple antenna panel downlink signal buffering for the communication slot; and initiate the prohibit timer for downlink signal buffering method reporting based at least in part on receiving the indication from the wireless device of whether the wireless device is performing single antenna panel downlink signal buffering or multiple antenna panel downlink signal buffering for the communication slot.

According to some embodiments, the cellular base station is further configured to: provide an indication to the wireless device of whether to perform single antenna panel downlink signal buffering or multiple antenna panel downlink signal buffering for the communication slot.

Still another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising: by a device: performing any or all parts of the preceding examples.

A further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

A yet further exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
at least two antenna panels;
at least one radio coupled to the at least two antenna panels; and
a processor coupled to the at least one radio;
wherein the wireless device is configured to:
receive a first physical downlink control channel (PDCCH), in a first control resource set (CORESET) of a plurality of configured CORESETS, wherein the plurality of CORESETS are associated with multiple transmission reception points (TRPs), wherein the first CORESET is configured with a first higher layer index;
select a downlink signal processing method for receiving downlink signals from at least a first signal processing method using a quasi-co-location (QCL) assumption for a single CORESET or a second signal processing method using QCL assumptions for two CORESETs, wherein selecting and switching between the first and second signal processing methods is based on radio resource control (RRC) signaling, wherein:
when the first signal processing method is selected, the wireless device processes one or more physical downlink shared channel (PDSCH) transmissions based on a QCL assumption associated with a selected CORESET, wherein the selected CORESET for which the one or more PDSCH transmissions are processed is selected as a CORESET in the latest slot with a lowest CORESET identifier (CORESET ID) from the plurality of configured CORESETs;
when the second signal processing method is selected, the wireless device processes one or more PDSCH transmissions based on respective QCL assumptions associated with selected CORESETs, wherein the selected CORESETs for which the one or more PDSCH transmissions are processed are selected as respective CORESETs in the latest slot with a lowest CORESET ID from configured CORESETs that are configured with the same higher layer index; and
signal processing according to the first or second signal processing method occurs during a window of time associated with the first PDCCH;
receive a first PDSCH transmission from at least one of the multiple TRPs as scheduled by the first PDCCH; and
process the PDSCH in accordance with the selected downlink signal processing method.

2. The wireless device of claim 1, wherein the wireless device is further configured to:
select one or more beams for which to perform downlink signal processing based at least in part on the downlink signal processing method selected.

3. The wireless device of claim 1, wherein the downlink signal processing method is selected based at least in part on one or more of:
respective CORESET IDs associated with respective CORESETS of the configured CORESETs; or whether a higher layer index is configured for each of the configured CORESETs.

4. The wireless device of claim 1, wherein the downlink signal processing method is selected based at least in part on reference signal received power (RSRP) reported by the wireless device for a reference signal associated with the configured CORESETs.

5. The wireless device of claim 1, wherein the downlink signal processing method is selected based at least in part on channel quality indicator (CQI) reported by the wireless device for a reference signal associated with the configured CORESETs.

6. The wireless device of claim 1, wherein the downlink signal processing method is selected based at least in part on whether a reference signal index is reported for a reference signal associated with the configured CORESETs.

7. The wireless device of claim 1, wherein the downlink signal processing method is selected based at least in part on whether a group based beam reporting indication provided by the wireless device within a specified period of time indicates that a reference signal index associated with each of one or more the configured CORESETs can be received simultaneously by the wireless device.

8. The wireless device of claim 1, wherein the wireless device is further configured to:
provide an indication of the selected downlink signal processing method for received downlink signals to a serving cellular base station of the wireless device.

9. The wireless device of claim 1, wherein, to receive the first PDCCH, the processor is further configured to cause the wireless device to:
receive a first candidate PDCCH in a first CORESET configured for the wireless device, wherein the first CORESET is configured with a first higher layer index and is associated with a first TRP; and
receive a second candidate PDCCH in a second CORESET configured for the wireless device, wherein the second CORESET is configured with a second higher layer index and is associated with a second TRP.

10. The wireless device of claim 9, wherein the processor is further configured to cause the wireless device to:
decode a portion of the processed downlink signals according to at least one decoded PDCCH of the first candidate PDCCH and the second candidate PDCCH.

11. An apparatus, comprising:
a processor configured to cause a wireless device to:
receive a first physical downlink control channel (PDCCH), in a first control resource set (CORESET) of a plurality of configured CORESETS, wherein the plurality of CORESETS are associated with multiple transmission reception points (TRPs), wherein the first CORESET is configured with a first higher layer index;
select a downlink signal processing method for receiving downlink signals from at least a first signal processing method using a quasi-co-location (QCL) assumption for a single CORESET or a second signal processing method using QCL assumptions for two CORESETs, wherein selecting and switching between the first and second signal processing methods is based on radio resource control (RRC) signaling, wherein:
when the first signal processing method is selected, the wireless device processes one or more physical downlink shared channel (PDSCH) transmissions based on a QCL assumption associated with a selected CORESET, wherein the selected CORESET for which the one or more PDSCH transmissions are processed is selected as a CORESET in the latest slot with a lowest CORESET identifier (CORESET ID) from the plurality of configured CORESETs;
when the second signal processing method is selected, the wireless device processes one or more PDSCH transmissions based on respective QCL assumptions associated with selected CORESETs, wherein the selected CORESETs for which the one or more PDSCH transmissions are processed are selected as respective CORESETs in the latest slot with a lowest CORESET ID from configured CORESETs that are configured with the same higher layer index; and
signal processing according to the first or second signal processing method occurs during a window of time associated with the first PDCCH;
receive a first PDSCH transmission from at least one of the multiple TRPs as scheduled by the first PDCCH; and
process the PDSCH in accordance with the selected downlink signal processing method.

12. The apparatus of claim 11, wherein the processor is further configured to cause the wireless device to:
determine whether a prohibit timer for downlink signal processing method reporting is configured and running; and
provide an indication of the selected downlink signal processing method to a serving cellular base station of the wireless device if no prohibit timer for downlink signal processing method reporting is running.

13. The apparatus of claim 11, wherein, to receive the first PDCCH, the processor is further configured to cause the wireless device to:
receive a first candidate PDCCH in a first CORESET configured for the wireless device, wherein the first CORESET is configured with a first higher layer index and is associated with a first TRP; and
receive a second candidate PDCCH in a second CORESET configured for the wireless device, wherein the second CORESET is configured with a second higher layer index and is associated with a second TRP.

14. The apparatus of claim 13, wherein the processor is further configured to cause the wireless device to:
decode a portion of the processed downlink signals according to at least one decoded PDCCH of the first candidate PDCCH and the second candidate PDCCH.

15. A method, comprising:
at a wireless device:
receiving a first physical downlink control channel (PDCCH), in a first control resource set (CORESET) of a plurality of configured CORESETS, wherein the plurality of CORESETS are associated with multiple transmission reception points (TRPs), wherein the first CORESET is configured with a first higher layer index;
selecting a downlink signal processing method for receiving downlink signals from at least a first signal processing method using a quasi-co-location (QCL) assumption for a single CORESET or a second signal processing method using QCL assumptions for two CORESETs, wherein selecting and switching between the first and second signal processing methods is based on radio resource control (RRC) signaling, wherein:
when the first signal processing method is selected, the wireless device processes one or more physical downlink shared channel (PDSCH) transmissions based on a QCL assumption associated with a selected CORESET, wherein the selected CORESET for which the one or more PDSCH transmissions are processed is selected as a CORESET in the latest slot with a lowest CORESET identifier (CORESET ID) from the plurality of configured CORESETs;
when the second signal processing method is selected, the wireless device processes one or more PDSCH transmissions based on respective QCL assumptions associated with selected CORESETs, wherein the selected CORESETs for which the one or more PDSCH transmissions are processed are selected as respective CORESETs in the latest slot with a lowest CORESET ID from configured CORESETs that are configured with the same higher layer index; and
signal processing according to the first or second signal processing method occurs during a window of time associated with the first PDCCH;
receiving a first PDSCH transmission from at least one of the multiple TRPs as scheduled by the first PDCCH; and
processing the PDSCH in accordance with the selected downlink signal processing method.

16. The method of claim 15, wherein, said receiving the first PDCCH comprises:
receiving a first candidate PDCCH in a first CORESET configured for the wireless device, wherein the first CORESET is configured with a first higher layer index and is associated with a first TRP; and
receiving a second candidate PDCCH in a second CORESET configured for the wireless device, wherein the second CORESET is configured with a second higher layer index and is associated with a second TRP.

17. The method of claim 16, further comprising:
decoding a portion of the processed downlink signals according to at least one decoded PDCCH of the first candidate PDCCH and the second candidate PDCCH.

18. The method of claim 15, further comprising selecting one or more beams for which to perform downlink signal processing based at least in part on the downlink signal processing method selected.

19. The method of claim 15, further comprising:
determining whether a prohibit timer for downlink signal processing method reporting is configured and running.

20. The method of claim 19, further comprising:
providing an indication of the selected downlink signal processing method to a serving cellular base station of the wireless device if no prohibit timer for downlink signal processing method reporting is running.

* * * * *